United States Patent Office 3,236,838
Patented Feb. 22, 1966

3,236,838
CERTAIN 1-SUBSTITUTED-BENZODIAZEPIN-2-ONE COMPOUNDS
Giles A. Archer, Essex Fells, and Leo Henryk Sternbach, Upper Montclair, N.J., assignors to Hoffmann-La Roche Inc., Nutley, N.J., a corporation of New Jersey
No Drawing. Filed June 9, 1964, Ser. No. 373,855
8 Claims. (Cl. 260—239.3)

This application is a continuation-in-part of application Serial No. 291,256, filed June 28, 1963 in the names of Giles A. Archer and Leo Henryk Sternbach.

The present invention relates to novel derivatives of 5-aryl-1,4-benzodiazepines and intermediates therefor and processes for making the foregoing. More specifically, the invention relates to 5-aryl-1,4-benzodiazepines substituted in the 1-position with a substituent of a type more particularly hereinafter identified.

The said novel 1-substituted 5-aryl-1,4-benzodiazepines and derivatives thereof to which the invention relates are selected from the group consisting of compounds of the formula

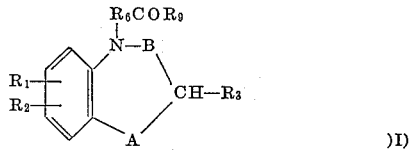

(I)

and pharmaceutically acceptable salts thereof, wherein
A is selected from the group consisting of

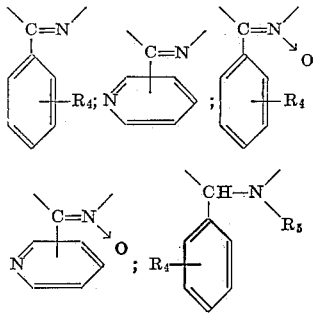

and

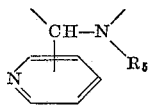

B is selected from the group consisting of carbonyl and methylene;

$R_1$, $R_2$ and $R_4$ are selected from the group consisting of halogen, hydrogen, trifluoromethyl, nitro, lower alkyl, amino and cyano;

$R_3$ is selected from the group consisting of hydrogen, lower alkyl, hydroxy and lower alkanoyloxy;

$R_5$ is selected from the group consisting of hydrogen, lower alkyl, lower acyl and

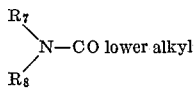

wherein $R_7$ and $R_8$ are as hereinafter set out;
$R_6$ is a lower alkylene group; and
$R_9$ is selected from the group consisting of lower alkyl, lower alkyloxy, phenyl and

wherein $R_7$ and $R_8$ are each selected from the group consisting of hydrogen, lower alkyl, phenyl and lower alkenyl. In a preferred aspect, $R_9$ in Formula I above is a

group. In a still more preferred embodiment, $R_6$ in Formula I above is methylene and $R_9$ is

In a still more preferred embodiment, A contains a

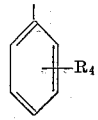

radical, B is carbonyl, $R_6$ is methylene, $R_9$ is

wherein $R_7$ is hydrogen and $R_8$ is methyl.
Those compounds wherein A is either

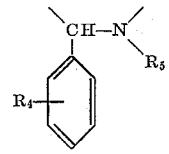

or

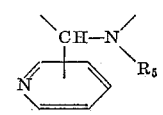

can be referred to as 4,5-dihydro derivatives of those compounds wherein A is

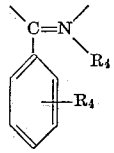

or

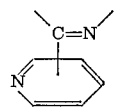

The symbols R have the following significance: $R_1$, $R_2$ and $R_4$ represent trifluoromethyl, nitro, amino, hydrogen, lower alkyl, cyano or halogen. The term "halogen" includes all four forms thereof, i.e., chlorine, fluorine, bromine and iodine. "Lower alkyl" includes straight and branched chain groups such as methyl, isobutyl, ethyl, propyl and the like. In a preferred embodiment, $R_1$ is hydrogen and $R_2$ is joined to the ring nucleus in the 7-position. In a still more preferred embodiment, $R_2$ is selected from the group consisting of halogen, advantageously, chlorine and trifluoromethyl. In a still more preferred embodiment, $R_2$ is chlorine and is joined to the ring nucleus in the 7-position. Preferably, when A in Formula I above includes a phenyl group, $R_4$ is joined to the latter at the 2'-position thereof.

$R_3$ represents hydrogen or a straight or branched chain lower alkyl group such as methyl, ethyl and the like, hydroxy or a lower alkanoyloxy group such as acetoxy.

$R_5$ represents hydrogen, lower alkyl such as methyl, a lower acyl group, such as acetyl, propionyl or the like or a

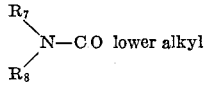

group wherein $R_7$ and $R_8$ are as above such as N-methyl carbamyl methyl.

$R_6$ designates a lower alkylene group which may be methylene, ethylene, methyl methylene or the like.

$R_7$ and $R_8$ represents hydrogen, a lower alkyl group which may be branched or straight chain such as methyl, ethyl, propyl, isobutyl or the like, a lower alkenyl group, such as allyl and phenyl including substituted derivatives thereof, e.g., halophenyl, lower alkyl phenyl, lower alkoxy phenyl and the like.

As is evident from the above compounds of the formula

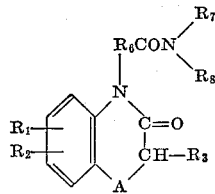

wherein $R_1$, $R_2$, $R_3$, $R_6$, $R_7$, $R_8$ and A are as above, are preferred.

As is further evident from the above, compounds having the formula of 7-$R_2$-2,3-dihydro-N-methyl-2-oxo-5-($R_4$-phenyl)-1H-1,4-benzodiazepin-1-acetamide wherein $R_2$ and $R_4$ have the same meaning as above are especially preferred.

In addition to the compounds of Formula I above, there are also encompassed within the scope of the present invention the pharmaceutically acceptable salts thereof. The compounds of Formula I above form pharmaceutically acceptable acid addition salts with pharmaceutically acceptable organic and inorganic acids such as hydrochloric acid, hydrobromic acid, sulfonic acid, phosphoric acid, nitric acid, tartaric acid, citric acid, camphorsulfonic acid, ethanesulfonic acid, ascorbic acid, salicyclic acid, maleic acid and the like.

Compounds of Formula I above also form quaternary ammonium salts with conventional quaternizing agents such as lower alkyl and lower alkenyl halides, e.g., methyl iodide, allyl bromide and di-lower alkyl sulfates such as dimethyl sulfate.

Compounds of the Formula I above wherein B is carbonyl and A is

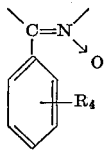

or

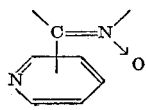

are especially of interest as intermediates in the preparation of the corresponding compounds of Formula I above wherein B is carbonyl and A is

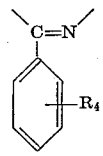

or

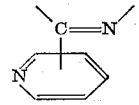

The latter compounds can be prepared by hydrogenation of the former compounds in the presence of a suitable hydrogenation catalyst such as Raney nickel or by treatment with a reducing agent, for example, a phosphorous trihalide such as phosphorous trichloride.

Compounds of Formula I above wherein $R_3$ is lower alkyl and hydrogen can be prepared from corresponding 5-aryl-1,4-benzodiazepines wherein the 1-position nitrogen atom is unsubstituted, i.e., bears a hydrogen atom attached thereto. For example, compounds corresponding to the formula of

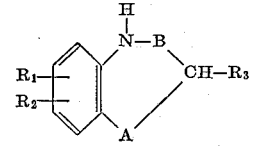

(II)

wherein A, B, $R_1$ and $R_2$ are as above, and $R_3$ is hydrogen or lower alkyl, can be reacted, preferably after first effecting conversion of said 1-unsubstituted compounds into their 1-sodio derivatives, with a compound of the formula $$X-R_6-CO-R_9 \quad (III)$$

wherein $R_6$ and $R_9$ have the same meaning as ascribed thereto hereinabove and X is a halogen atom selected from the group consisting of chlorine, bromine and iodine.

The above reaction can be conducted in an inert organic solvent medium utilizing one or more inert organic solvents such as methanol, ethanol, dimethylformamide, benzene, toluene or the like. Temperature and pressure are not critical and the reaction can be carried out at room temperature and atmospheric pressure or at elevated temperatures and/or elevated pressures or at reduced temperatures and/or reduced pressures. Conventional reagents such as sodium methoxide, sodium hydride or the like can be employed to form the sodio derivatives. The 1-sodio derivatives of the 1-unsubstituted compounds, i.e., those having hydrogen in the 1-position, are not part of this invention.

Compounds of Formula I above wherein A is

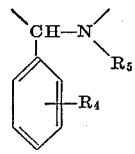

or

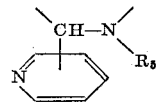

can be prepared from the corresponding compounds of Formula I above wherein A is

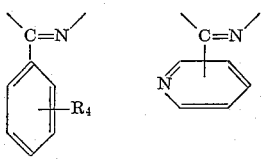

by reduction. For example, the last-mentioned compounds can be reduced with hydrogen in the presence of a suitable hydrogenation catalyst such as platinum oxide to yield the corresponding compounds wherein $R_5$ is hydrogen and, in turn, these compounds can be converted into corresponding compounds wherein $R_5$ is lower alkyl by reaction with a lower alkyl halide such as methyl iodide or a di-lower alkyl sulfate such as dimethyl sulfate. Alternatively, the said last-mentioned compounds can be first treated with a lower alkyl halide such as methyl iodide or a di-lower alkyl sulfate such as dimethyl sulfate and the resultant quaternary containing a lower alkyl group in the 4-position can be reduced by a borohydride (potassium borohydride, sodium borohydride, calcium borohydride and the like) or any suitable reductant whereby to prepare compounds of Formula I above wherein A contains the

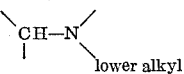

radical. Similarly, those compounds of Formula I above wherein $R_5$ is hydrogen can be reacted with any conventional acylating agent such as acetyl chloride or acetic anhydride whereby to form the corresponding compound wherein $R_5$ is lower acyl. Furthermore, compounds of Formula I above wherein $R_5$ is hydrogen can be converted to compounds wherein $R_5$ is carbamoyl-lower alkyl by treating such compounds with a compound of the formula $$X-R_6-CON\begin{matrix}R_7\\R_8\end{matrix}$$

wherein $R_6$, $R_7$ and $R_8$ have the same meaning as ascribed thereto hereinabove and X is a halogen atom selected from the group consisting of chlorine, bromine and iodine.

Compounds of Formula I above wherein $R_3$ is lower alkanoyloxy can be prepared from the corresponding compounds of Formula I above wherein $R_3$ is hydrogen and A is

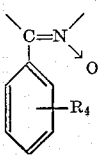

or

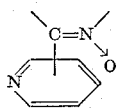

by treating the last-mentioned compounds with an anhydride of a lower alkanoic acid, e.g., acetic anhydride. The resultant compounds, i.e., compounds of Formula I above wherein $R_3$ is lower alkanoyloxy, can be converted into compounds wherein $R_3$ is hydroxy by treatment of such compounds with an alkali metal hydroxide such as sodium hydroxide, an alkaline earth metal hydroxide or a mineral acid.

Compounds of Formula I above wherein $R_1$ is hydrogen and $R_2$ and/or $R_4$ is nitro can be reduced by conventional techniques, e.g., hydrogenation in the presence of Raney nickel, to form the corresponding compound of Formula I above wherein $R_2$ and/or $R_4$ is amino. The resultant compound, wherein $R_2$ and/or $R_4$ is amino, if desired, can be selectively converted into the corresponding compound wherein $R_2$ and/or $R_4$ is halogen or cyano by the treatment thereof with nitrous acid in the presence of a mineral acid, e.g., hydrochloric acid, followed by treatment of the resultant substance with a strong hydrohalic acid, e.g., a hydrochloric acid, in the presence of a copper catalyst, e.g., cuprous chloride in the case where a compound of Formula I above wherein $R_2$ and/or $R_4$ is halogen is desired, and cuprous cyanide in the case where a compound of Formula I above wherein $R_2$ and/or $R_4$ is cyano is desired.

Compounds of Formula I above and their pharmaceutically acceptable salts are useful as anticonvulsants, and are particularly noteworthy in that their efficacy for this purpose is not impaired by unwanted side effects. They can be administered internally, for example, parenterally or enterally in conventional pharmaceutical dosage forms. For example, they can be incorporated in conventional liquid or solid vehicles to provide elixirs, suspensions, tablets, capsules, powders and the like according to accepted pharmaceutical practice.

The following examples are illustrative but not limitative of the present invention. All temperatures are in degrees centigrade and all melting points are corrected.

Example 1

0.10 mole of 7-chloro-1,3-dihydro-5-phenyl-2H-1,4-benzodiazepin-2-one was dissolved in 200 ml. of anhydrous dimethylformamide and converted to the sodium salt by addition of 0.11 mole of solid sodium methoxide. The conversion was accompanied by stirring and heating of the reaction mixture on a steam bath for 15 minutes. A solution of 0.11 mole of N-methyl-α-bromoacetamide in 165 ml. of anhydrous toluene was then added dropwise to the heated mixture over a period of 30 to 45 minutes. The resultant mixture was stirred and heated for 2 hours. The reaction mixture was then concentrated in vacuo to about 150 ml. and was poured slowly into a stirred mixture of ice and water (1500 ml.). A precipitate formed and such precipitate was filtered off after overnight refrigeration. The precipitate was washed thoroughly with water and dried in vacuo. Recrystallization of the precipitate from acetone gave 7-chloro-2,3-dihydro-N-methyl-2-oxo-5-phenyl-1H-1,4-benzodiazepin-1-acetamide, M.P. 252–254° (dec.).

Example 2

0.10 mole of 7-chloro-1,3-dihydro-5-phenyl-2H-1,4-benzodiazepin-2-one was dissolved in 200 ml. of anhydrous dimethylformamide and converted to the sodium salt by addition of 0.11 mole of solid sodium methoxide. The conversion was accompanied by stirring and heating of the reaction mixture on a steam bath for 15 minutes. A solution of 0.11 mole of α-chloroacetamide in 165 ml. of anhydrous toluene was then added dropwise to the heated mixture over a period of 30 to 45 minutes. The resultant mixture was stirred and heated for 2 hours. The reaction mixture was then concentrated in vacuo to about 150 ml. and was poured slowly into a stirred mixture of ice and water (1500 ml.). A precipitate formed and such precipitate was filtered off after overnight refrigeration. The precipitate was washed thoroughly with water and dried in vacuo. Recrystallization of the precipitate from acetone gave 7-chloro-2,3-dihydro-2-oxo-5-phenyl-1H-1,4-benzodiazepin-1acetamide, melting point 233–234°.

Example 3

7-chloro-1,3-dihydro - 5 - phenyl-2H-1,4-benzodiazepin-2-one was reacted with N-ethyl-α-bromoacetamide according to the procedure described in Example 2. Recrystallization from acetone gave 7-chloro-N-ethyl-2,3-dihydro-2-oxo-5-phenyl-1H-1,4-benzodiazepin-1-acetamide as colorless prisms, melting point 211–212°.

Example 4

7-chloro-1,3-dihydro - 5 - phenyl-2H-1,4-benzodiazepin-2-one was reacted with N,N-diethyl-α-chloroacetamide according to the procedure set out in Example 2. Recrystallization from acetone-hexane gave 7-chloro-N,N-diethyl-2,3-dihydro - 2 - oxo - 5 - phenyl-1H-1,4-benzodiazepin-1-acetamide as colorless prisms, melting point 148–149°.

Example 5

7-chloro-1,3-dihydro - 5 - phenyl-2H-1,4-benzodiazepin-2-one was reacted with N,N-dimethyl-α-bromoacetamide according to the procedure described in Example 2. Recrystallization from acetone-hexane gave 7-chloro-2,3-dihydro-N,N-dimethyl - 2 - oxo-5-phenyl-1H-1,4-benzodiazepin-1-acetamide as colorless prisms, melting point 179–181°.

Example 6

7 - chloro-5-(2 - chlorophenyl)-1,3-dihydro-2H-1,4-benzodiazepin-2-one was reacted with N-methyl-α-bromoacetamide according to the procedure set out in Example 2. Recrystallization from methylene chloride-hexane gave 7 - chloro-5-(2 - chlorophenyl)-2,3 - dihydro-N-methyl-2-oxo-1H-1,4-benzodiazepin-1-acetamide as colorless prisms, melting point 197–199°.

Example 7

1,3-dihydro-7-nitro - 5 - phenyl-2H-1,4-benzodiazepin-2-one was reacted with N-methyl-α-bromoacetamide according to the procedure set out in Example 2. Recrystallization from acetone gave 2,3-dihydro-N-methyl-7-nitro-2-oxo-5-phenyl-1H-1,4-benzodiazepin-1-acetamide as colorless prisms, melting point 231–232°.

Example 8

7 - chloro-5-(2 - fluorophenyl)-1,3-dihydro-2H-1,4-benzodiazepin-2-one was reacted with N-methyl-α-bromoacetamide according to the procedure described in Example 2. Recrystallization from acetone gave 7-chloro-5-(2 - fluorophenyl)-2,3-dihydro - N - methyl-2-oxo-1H-1,4-benzodiazepin-1-acetamide as colorless prisms, melting point 212–214°.

Example 9

1,3-dihydro - 5 - phenyl - 7 - trifluoromethyl - 2H - 1,4 - benzodiazepin - 2 - one was reacted with N - methyl - α-bromoacetamide according to the procedure set out in Example 2. Recrystallization from acetone gave 2,3-dihydro - N - methyl - 2 - oxo - 5 - phenyl - 7 - trifluoromethyl-1H - 1,4 - benzodiazepin - 1 - acetamide as colorless needles, melting point 260–261°.

Example 10

1,3 - dihydro - 5 - (2 - fluorophenyl) - 7 - nitro - 2H - 1,4 - benzodiazepin - 2 - one was reacted with N - methyl - α-bromoacetamide according to the procedure set out in Example 2. Recrystallization from acetone gave colorless needles, melting point 207–208°.

Example 11

1,3 - dihydro - 5 - phenyl - 2H - 1,4 - benzodiazepin - 2-one was reacted with N-methyl-α-bromoacetamide according to the procedure described in Example 2. Recrystallization from acetone gave 2,3 - dihydro - N - methyl - 2 - oxo - 5 - phenyl - 1H - 1,4 - benzodiazepin - 1-acetamide as colorless needles, melting point 215°.

Example 12

7 - chloro - 1,3 - dihydro - 5 - phenyl - 2H - 1,4 - benzodiazepin - 2 - one was reacted with N - allyl - α - bromoacetamide according to the procedure set out in Example 2. Recrystallization from ethanol gave N-allyl-7 - chloro - 2,3 - dihydro - 2 - oxo - 5 - phenyl - 1H - 1,4 - benzodiazepin-1-acetamide as colorless needles, melting point 185–186°.

Example 13

7 - chloro - 1,3 - dihydro - 5 - phenyl - 2H - 1,4 - benzodiazepin - 2 - one 4 - oxide was reacted with N - methyl - α - bromoacetamide according to the procedure set out in Example 2. Recrystallization from acetone gave 7 - chloro - 2,3 - dihydro - N - methyl - 2 - oxo - 5 - phenyl - 1H - 1,4 - benzodiazepin - 1 - acetamide 4 -oxide as colorless prisms, melting point 269°.

Example 14

To a solution of 7 - chloro - 2,3 - dihydro - N - methyl - 2 - oxo - 5 - phenyl - 1H - 1,4 - benzodiazepin - 1 - acetamide - 4 - oxo - (1 gm.) in chloroform (15 ml.) there was added phosphorus trichloride (2 ml.). The resultant mixture was refluxed for 1 hour. The mixture was cooled, diluted with methylene chloride (50 ml.), and shaken with ice cold 50 percent aqueous potassium hydroxide (20 ml.). The organic layer was then washed with water, dried over anhydrous magnesium sulfate, and evaporated to give 7 - chloro - 2,3 - dihydro - N - methyl - 2 - oxo - 5 - phenyl - 1H - 1,4 - benzodiazepin - 1 - acetamide as a colorless crystalline residue, melting point 252–254°.

Example 15

A suspension of 7 - chloro - 2,3 - dihydro - N - methyl - 2 - oxo - 5 - phenyl - 1H - 1,4 - benzodiazepin - 1 - acetamide (34.2 gm., 0.10 mole) and platinum oxide (3.4 gm.) in glacial acetic acid (500 ml.) was shaken under hydrogen at 26° C. and 725 mm. partial pressure. After absorption of 1 molar proportion of hydrogen (in 3 hours), the mixture was filtered and the filtrate concentrated in vacuo to 100–150 ml. The filtrate was diluted with water (1 l.) and made basic with sodium hydroxide solution to give a precipitate of the product. The precipitate was filtered off, washed with water and recrystallized from ethylene chloride-hexane, and from aqueous ethanol yielding 7 - chloro - 2,3,4,5 - tetrahydro - N - methyl - 2 - oxo - 5 - phenyl - 1H - 1,4 - benzodiazepin - 1-acetamide as colorless needles, melting point 179–181°.

Example 16

A solution of 7 - chloro - 2,3,4,5 - tetrahydro - N - methyl - 2 - oxo - 5 - phenyl - 1H - 1,4 - benzodiazepin - 1-acetamide (11.0 gm., 0.032 mole) in methanol (110 ml.) was cooled and treated with methanolic 2 N hydrochloric acid (1.1 equivalents), followed by dilution of the solution with three volumes of acetone. The resulting precipitated crystalline monohydrochloride was filtered off, washed with acetone, and recrystallized from methanol-acetone to give colorless prisms, melting point 299–302°.

Example 17

7 - chloro - 1,3 - dihydro - 5 - phenyl - 2H - 1,4 - benzodiazepin - 2 - one was reacted with N - methyl - α - bromopropionamide according to the procedure set out in Example 2. Recrystallization from acetone gave 7 - chloro - 2,3 - dihydro - α,N - dimethyl - 2 - oxo - 5 - phenyl - 1H - 1,4 - benzodiazepin - 1 - acetamide as colorless prisms, melting point 189–190°.

Example 18

7 - chloro - 1,3 - dihydro - 5 - phenyl - 2H - 1,4 - benzodiazepin-2-one was reacted with β-chloropropionamide according to the procedure set out in Example 2. Recrystallization from acetone gave colorless prisms, melting point 200–201°.

Example 19

0.100 mole of 7 - chloro - 1,3 - dihydro - 5 - phenyl - 2H - 1,4 - benzodiazepin - 2 - one was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of phenacyl bromide was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated, in vacuo, to a small volume and poured slowly into a large volume of ice water. A precipitate which formed was removed by filtration. Recrystallization of the precipitate from ethanol gave 7 - chloro - 1,3 - dihydro - 1 - phenacyl - 5 - phenyl - 2H - 1,4 - benzodiazepin - 2 - one as colorless prisms, M.P. 174–175°.

*Example 20*

0.100 mole of 7-chloro-1,3-dihydro-5-phenyl-2H-1,4-benzodiazepin-2-one was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of ethyl-α-bromoacetate was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated in vacuo to a small volume and poured slowly into a large volume of ice water. A precipitate which formed was removed by filtration. Recrystallization of the precipitate from acetone-hexane gave 7-chloro-2,3-dihydro-2-oxo-5-phenyl-1H-1,4-benzodiazepin-1-acetic acid ethyl ester as colorless prisms, M.P. 127–129°.

*Example 21*

0.100 mole of 7-chloro-1,3-dihydro-5-phenyl-2H-1,4-benzodiazepin-2-one was dissolved in anhydrous dimethylformamide (200 mls.). The compound was converted to the sodium salt thereof by the addition of 0.110 moles of sodium methoxide to the reaction medium. The mixture was stirred and heated on the steam bath for 15 minutes with protection from atmospheric moisture. 0.110 mole of 1-chloroacetone was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated in vacuo to a small volume and poured slowly into a large volume of ice water. A precipitate which formed was removed by filtration. Recrystallization of the precipitate from acetone gave 1-acetonyl-7-chloro-1,3-dihydro-5-phenyl-2H-1,4-benzodiazepin-2-one as colorless prisms, M.P. 169–171°.

*Example 22*

0.100 mole of 7-chloro-1,3-dihydro-5-phenyl-2H-1,4-benzodiazepin-2-one was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of methyl-α-bromoacetate was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated in vacuo to a small volume and poured slowly into a large volume of ice water. A precipitate which formed was removed by filtration. Crystallization of the precipitate from ethanol gave 7 - chloro - 2,3 - dihydro - 2 - oxo - 5 - phenyl - 1H-1,4-benzodiazepin-1-acetic acid methyl ester as colorless prisms, M.P. 140–141°.

*Example 23*

7 - chloro - 1,3 - dihydro - 5 - phenyl - 2H - 1,4 - benzodiazepin-2-one (27.1 g., 0.100 mole) was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of ethyl-β-bromopropionate was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated in vacuo to a small volume and poured slowly into a large volume of ice water yielding 7 - chloro - 2,3 - dihydro - 2 - oxo - 5 - phenyl - 1H-1,4-benzodiazepine-1-propionic acid ethyl ester as an oil.

The free base was extracted with methylene chloride and converted to its hydrochloride by dissolving the same in a slight excess over the calculated amount of methanolic 1 N-hydrochloric acid. On addition of ether, the hydrochloride precipitated and was separated by filtration. Recrystallization from methanol-ether gave 7-chloro - 2,3 - dihydro - 2 - oxo - 5 - phenyl - 1H - 1,4-benzodiazepine-1-propionic acid ethyl ester hydrochloride as colorless prisms, M.P. 225–227°.

*Example 24*

7 - chloro - 1,3 - dihydro - 5 - phenyl - 2H - 1,4 - benzodiazepin-2-one (27.1 g., 0.100 mole) was dissolved in anhydrous dimethylformamide (200 mls.). The compound was converted to the sodium salt thereof by the addition of 0.110 mole of sodium methoxide to the reaction medium. The mixture was stirred and heated on the steam bath for 15 minutes with protection from atmospheric moisture. 0.110 mole of N-phenyl-α-bromacetamide was dissolved in 165 mls. of toluene and the resultant solution was carefully added to the heated reaction mixture over a period of 30–45 minutes. After such addition was completed, the mixture was stirred and heated for an additional two hours. The reaction mixture was then concentrated in vacuo to a small volume and poured slowly into a large volume of ice water. A precipitate which formed was removed by filtration. Recrystallization of the precipitate from acetone gave 7-choloro - 2,3 - dihydro - 2 - oxo - 5 - phenyl - 1H - 1,4-benzodiazepin-1-acetanilide, M.P. 220–222°.

*Example 25*

A mixture of 7 - chloro - 2,3 - dihydro - N - methyl - 2-oxo - 5 - phenyl - 1H - 1,4 - benzodiazepin - 1 - acetamide 4-oxide (4.00 g., 11.2 millimoles) and acetic anhydride (40 ml.) was stirred, and heated on a steambath for 1 hour. The mixture was evaporated in vacuo and the resulting yellow gum was recrystallized from benzene-hexane as colorless needles, M.P. 189–191°. Recrystallization from acetone-ether gave 3-acetoxy-7-chloro-2,3-dihydro - N - methyl - 2 - oxo - 5 - phenyl - 1H - 1,4-benzodiazepin-1-acetamide as colorless needles, M.P. 189–191°.

*Example 26*

To a stirred solution of 3-acetoxy-7-chloro-2,3-dihydro-N-methyl-2-oxo-5-phenyl-1H-1,4 - benzodiazepin - 1 - acetamide (2.91 g., 7.5 millimoles) in ethanol (70 ml.), was carefully added 7.5 mls. of 1 N-sodium hydroxide solution, diluted with water (75 ml.). The mixture was stirred for 24 hours at room temperature, poured into water (1.5 liters), and then extracted with methylene chloride. The methylene chloride extract was evaporated yielding 7-chloro-2,3-dihydro-3-hydroxy-N-methyl-2 - oxo-5-phenyl-1H-1,4-benzodiazepin-1-acetamide as a crystalline residue. Upon recrystallization from methylene chloride-hexane, the product was obtained as colorless prisms, M.P. 140–145°.

*Example 27*

A mixture of 7-chloro-2,3-dihydro-N-methyl-2-oxo-5-phenyl-1H-1,4-benzodiazepin-1-acetamide (17.0 g., 50 millimoles) and dimethyl sulfate (12.5 g., 100 millimoles) in benzene (300 ml.) was refluxed for 20 hours. 7-chloro-2,3-dihydro-4-methyl-1-(methylcarbamoylmethyl)-2-oxo-5-phenyl-1H-1,4-benzodiazepinium methyl sulfate crystallized on cooling the mixture and was separated by filtration, M.P. 174–176°. Upon recrystallization from methanol-ether, the product was obtained as colorless needles, M.P. 173–175°.

*Example 28*

To a solution of 7-chloro-2,3-dihydro-4-methyl-1-(methylcarbamoylmethyl)-2-oxo-5-phenyl-1H-1,4-benzodiazepinium methyl sulfate (21.0 g., 45 mm.) in anhydrous ethanol (250 ml.), there was carefully added potassium borohydride (7.50 g., 153 millimoles) over a period of 20 minutes. The mixture was stirred for 20 hours at room temperature, poured into cold water, and made basic with dilute sodium hydroxide solution. 7-chloro-2,3,4,5-tetrahydro-4-N-dimethyl-2-oxo-5-phenyl-1H-1,4-benzodiazepin-1-acetamide precipitated and was filtered off. Upon recrystallization from methylene chloride-hexane, the product was obtained as colorless prisms, M.P. 155–157°.

7-chloro-2,3-dihydro-4-N-dimethyl-2-oxo-5-phenyl-1H-1,4-benzodiazepin-1-acetamide was dissolved in the calculated quantity of methanolic 2 N-hydrochloric acid. Ether was added to the resultant solution to precipitate 7-chloro-2,3-dihydro-4-N-dimethyl-2-oxo-5-phenyl-1H-1,4-benzodiazepin-1-acetamide hydrochloride. Recrystallization from methanol-ether gave the hydrochloride as colorless prisms, M.P. 231–233°.

*Example 29*

To a solution of 7-chloro-2,3,4,5-tetrahydro-N-methyl-2-oxo-5-phenyl-1H-1,4-benzodiazepin-1-acetamide (0.50 g., 1.5 millimoles) in methyl ethyl ketone (25 ml.), there was added methyl iodide (2.20 g., 15 millimoles). The resultant mixture was refluxed for 6 hours. The mixture was then concentrated in vacuo, poured into water, made basic with dilute sodium hydroxide and extracted with methylene chloride, to give 7-chloro-2,3,4,5-tetrahydro-4-N-dimethyl-2-oxo-5-phenyl-1H-1,4-benzodiazepin-1-acetamide as a gum. Recrystallization from methylene chloride-hexane gave colorless prisms of the product, M.P. 160°.

*Example 30*

A mixture of 7-chloro-2,3,4,5-tetrahydro-N-methyl-2-oxo-5-phenyl-1H-1,4-benzodiazepin-1-acetamide (9.10 g., 26.5 millimoles), N-methyl-α-bromoacetamide (4.50 g., 30 millimoles) and sodium iodide (4.50 g., 30 millimoles) in acetone (120 ml.) was stirred and refluxed for 24 hours. The solvent was evaporated in vacuo, and the residue was partitioned between methylene chloride and dilute sodium hydroxide. Evaporation of the organic layer gave a gum. Recrystallization from acetone gave colorless needles of 7-chloro-2,3,4,5-tetrahydro-N,N'-dimethyl-2-oxo-5-phenyl-1H-1,4-benzodiazepine-1,4-diacetamide, M.P. 177–179°.

7-chloro-2,3,4,5-tetrahydro-N,N'-dimethyl-2-oxo-5-phenyl-1H-1,4-benzodiazepine-1,4-diacetamide hydrochloride was prepared as in Example 28 above. Recrystallization from methanol-ether gave colorless prisms of the hydrochloride, M.P. 208–210°.

*Example 31*

To a solution of 2,3-dihydro-7-nitro-5-phenyl-1H-1,4-benzodiazepine (26.7 gm., 0.100 mole) in anhydrous N,N-dimethylformamide (300 ml.), was added sodium methoxide (5.94 g., 0.110 mole). The mixture was stirred at room temperature for 1 hour. A solution of N,N-dimethyl-yl-bromoacetamide (18.39 m., 0.110 mole) in 100 ml. of toluene was then carefully added over a period of 2 hours. The mixture was stirred and heated in a water bath at 60° for 1 hour. It was then concentrated in vacuo, diluted with water, and extracted with methylene chloride. The methylene chloride extract was washed with water, dried over anhydrous sodium sulfate, and evaporated in vacuo. The material remaining after evaporation was dissolved in benzene, and the resultant solution was filtered through a short column of "Woelm" neutral alumina, activity I. Evaporation of the benzene eluate and crystallization of the material remaining after evaporation, from acetone-hexane gave 2,3-dihydro-N,N-dimethyl-7-nitro-5-phenyl-1H-1,4-benzodiazepin-1-acetamide as yellow needles, M.P. 119–121°.

2,3-dihydro-N,N-dimethyl-7-nitro-5-phenyl-1H-1,4-benzodiazepin-1-acetamide was dissolved in a slight excess over the calculated quantity of methanolic 1.5 N hydrogen chloride. On addition of ether to the resultant solution, 2,3-dihydro-N,N-dimethyl-7-nitro-5-phenyl-1H-1,4-benzodiazepin-1-acetamide hydrochloride precipitated. The product, upon recrystallization from methanol-ether gave yellow needles, M.P. 242–245°.

*Example 32*

A solution of 2,3-dihydro-N,N-dimethyl-7-nitro-5-phenyl-1H-1,4-benzodiazepin-1-acetamide (8.80 gm., 0.0247 mole) in methanol (250 ml.) was hydrogenated at 26° and 733 mm. pressure, over alcohol-washed Raney nickel (1.5 teaspoonful, activity ca. W–2). Absorption of hydrogen ceased after 3 hours. The catalyst was filtered off, washed with methanol, and discarded. Evaporation of the filtrates, and recrystallization of the residue from methylene chloride-hexane, gave 7-amino-2,3-dihydro-N,N-dimethyl-5-phenyl-1H-1,4-benzodiazepin-1-acetamide as yellow prisms, M.P. 187–189°.

*Example 33*

A stirred solution of 7-amino-2,3-dihydro-N,N-dimethyl-5-phenyl-1H-1,4-benzodiazepin-1-acetamide in 3 N hydrochloric acid (30 ml., 5 equivalents) was cooled to —10°, and treated dropwise with a solution of sodium nitrite (1.4 gms.) in water (5 ml.), until the potassium iodide starch reaction of the solution remained positive for 15 minutes. The temperature of the resulting solution was allowed to rise to +10° towards the end of the reaction. The resultant solution was carefully added over a period of 35 minutes, to a stirred solution of cuprous chloride (3.5 gm.) in a mixture of conc. hydrochloric acid (20 ml.) and water (10 ml.). After the addition was complete, the mixture was heated in a water bath at 35–40° (3 hours), and finally at 60° (10 mins.), until evolution of nitrogen ceased. The reaction mixture was diluted with water, made basic with concentrated aqueous ammonia, and extracted with methylene chloride. The extract was washed with water, dried over anhydrous sodium sulfate and extracted to give 7-chloro-2,3-dihydro-N,N-dimethyl-5-phenyl-1H-1,4-benzodiazepin-1-acetamide as a non-crystalline gum.

7-chloro-2,3-dihydro-N,N-dimethyl-5-phenyl-1H-1,4-benzodiazepin-1-acetamide was dissolved in a slight excess over the calculated quantity of methanolic 1.5 N hydrogen chloride. On addition of ether to the resultant solution, 7-chloro-2,3-dihydro-N,N-dimethyl-5-phenyl-1H-1,4-benzodiazepin-1-acetamide hydrochloride precipitated. The product upon recrystallization from methanol-ether gave yellow prisms, M.P. 243–245°.

*Example 34*

To a solution of 2,3-dihydro-7-nitro-5-phenyl-1H-1,4-benzodiazepine (26.7 gm., 0.100 mole) in anhydrous N,N-dimethylformamide (300 ml.), was added sodium methoxide (5.94 gm., 0.110 mole), and the mixture was stirred at room temperature for 1 hour. A solution of N-methyl-α-bromoacetamide (16.7 gm., 0.110 mole) in toluene (100 ml.) was then added dropwise over 2 hours. The mixture was stirred and heated in a water bath at 60° for 1 hour. It was then concentrated in vacuo, diluted with water, and extracted with methylene chloride. The methylene chloride extract was washed with water, dried over anhydrous sodium sulfate, and evaporated in vacuo. The material remaining after evaporation was dissolved in benzene, and the resultant solution was filtered through a short column of "Woelm" neutral alumina, activity I. Evaporation of the benzene eluate and crystallization of the material from acetone gave 2,3-dihydro-N-methyl-7-nitro-5-phenyl-1H-1,4-benzodiazepin-1-acetamide as yellow needles, M.P. 223–225°.

2,3 - dihydro-N-methyl-7-nitro-5-phenyl-1H-1,4-benzodiazepin-1-acetamide was dissolved in a slight excess over the calculated quantity of methanolic 1.5 N hydrogen chloride. On addition of ether to the resultant solution, 2,3 - dihydro - N - methyl-7-nitro-5-phenyl-1H-1,4-benzodiazepin-1-acetamide hydrochloride precipitated. The hydrochloride recrystallized from methanol-acetone as yellow prisms, M.P. 258–260°.

*Example 35*

A solution of 2,3-dihydro-N-methyl-7-nitro-5-phenyl-1H-1,4-benzodiazepin-1-acetamide (26.3 gm., 0.0778 mole) in methanol (800 ml.) was hydrogenated at 28° and 730 mm. pressure, over alcohol-washed Raney nickel (3 teaspoonsful, activity ca. W–2). Absorption of hydrogen ceased after 3.5 hours. The catalyst was filtered off, washed with methanol, and discarded. Evaporation of the filtrates, and recrystallization of the residue from methylene chloride-hexane, gave tan-colored prisms of 7-amino-2,3-dihydro-N-methyl-5-phenyl-1H-1,4 - benzodiazepin-1-acetamide, M.P. 190–192°.

*Example 36*

A stirred solution of 13.5 gms. (0.0450 mole) of 7-amino - 2,3 - dihydro-N-methyl-5-phenyl-1H-1,4-benzodiazepin-1-acetamide in 3 N hydrochloric acid (75 ml., 5 equivalents) was cooled to −10°, and treated dropwise with a solution of sodium nitrite (3.5 gms.) in water (8 ml.), until the potassium iodide starch reaction of the solution remained positive for 15 minutes. The temperature of the resulting solution was allowed to rise to +10° towards the end of the reaction. The resultant solution was added dropwise, over 35 minutes, to a stirred solution of cuprous chloride (9.0 gms.) in a mixture of conc. hydrochloric acid (47 ml.) and water (23 ml.). After the solution was complete, the mixture was heated in a water bath at 35–40° (3 hours), and finally at 60° (10 mins.), until evolution of nitrogen ceased. The reaction mixture was diluted with water, made basic with concentrated aqueous ammonia, and extracted with methylene chloride. The methylene chloride extract was washed with water, dried over anhydrous sodium sulfate, and evaporated to give 7 - chloro - 2,3 - dihydro-N-methyl-5-phenyl-1H-1,4-benzodiazepin-1-acetamide, M.P. 186–189°. The product, upon recrystallization from methylene chloride-hexane was found to have a melting point of 187–189°.

The hydrochloride of 7-chloro-2,3-dihydro-N-methyl-5-phenyl-1H-1,4-benzodiazepin-1-acetamide was prepared as in Example 34. Recrystallization of the hydrochloride from methanol-ether gave yellow needles of the hydrochloride, M.P. 252–254°.

*Example 37*

To a solution of 7-bromo-1,3-dihydro-5-(2-pyridyl)-2H-1,4-benzodiazepin-2-one (9.48 gm., 30 millimoles), in anhydrous N,N-dimethylformamide (90 ml.), was added sodium methoxide (1.82 gm., 33 millimoles). The resultant mixture was stirred for 15 minutes. A solution of N-methyl-α-bromoacetamide (4.79 gm., 31.5 millimoles) in anhydrous toluene (25 ml.) was then carefully added over a period of two hours. Stirring was continued for 24 hours at 25°, followed by 2 hours at 95–100°. The mixture was then cooled and poured into water (1 l.). Tan colored prisms precipitated. Chromatography of the mixture over an activated magnesium silicate (Florisil) column (120 gm.), and elution with ethyl acetate, gave a substance, which was further chromatographed over "Woelm" neutral alumina, activity III (60 gm.). Elution with methylene chloride, and evaporation of the eluates, gave 7-bromo-2,3-dihydro-N-methyl-2-oxo-5-(2-pyridyl)-1H-1,4-benzodiazepin-1-acetamide as a pale yellow foam. Crystallization of the product from methylene chloride-hexane and from acetone-petroleum ether, yielded colorless needles, M.P. 230–232°.

*Example 38*

To a solution of 2,3-dihydro-7-nitro-5-(2-pyridyl)-1H-1,4-benzodiazepine (21.50 gm., 80 millimoles) in anhydrous N,N-dimethylformamide (75 ml.), was added sodium methoxide (4.72 gm., 88 millimoles), and the mixture was stirred for 3 hours at room temperature. A solution of N-methyl-α-iodoacetamide (17.6 gm., 88 millimoles) in anhydrous N,N-dimethylformamide (50 ml.) was added dropwise to the resultant mixture over a period of 1.5 hours. The mixture was next stirred and heated in an oil-bath at 100° for 24 hours, then concentrated in vacuo, cooled, and poured into water (1 liter). A precipitate formed which was recovered by extraction with methylene chloride. The extract was washed, dried, and purified by filtration through a short column containing "Woelm" neutral alumina, activity I (100 gm.). Evaporation of the eluates, and recrystallization of the residue from benzene-hexane, gave yellow prisms of 2,3-dihydro-N - methyl-7-nitro-5-(2-pyridyl)-1H-1,4-benzodiazepin-1-acetamide, melting point 183–185°.

The above N-methyl-α-iodoacetamide was prepared by refluxing a mixture of N-methyl-α-bromo-acetamide (45.6 gm., 300 millimoles), potassium iodide (55.0 gm., 330 millimoles) and butan-2-one (300 ml.) for 1 hour. The mixture was cooled, and filtered to remove inorganic salts. The filtrate was evaporated in vacuo, and the resulting crude product was recrystallized from ether-petroleum ether, giving pale yellow needles of N-methyl-α-iodoacetamide, melting point 68–70°.

We claim:
1. A compound selected from the group consisting of compounds of the formula of

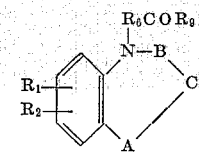

and pharmaceutically acceptable salts thereof, wherein A is selected from the group consisting of

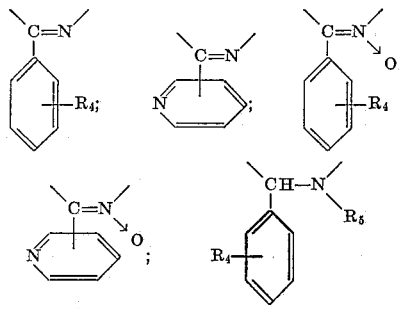

and

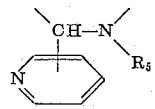

B is selected from the group consisting of carbonyl and methylene;

$R_1$, $R_2$ and $R_4$ are selected from the group consisting of halogen, hydrogen, trifluoromethyl, nitro, lower alkyl, amino and cyano;

$R_3$ is selected from the group consisting of hydrogen, lower alkyl, hydroxy and lower alkanoyloxy;

$R_5$ is selected from the group consisting of hydrogen, lower alkyl, lower alkanoyl and

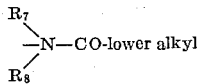

wherein $R_7$ and $R_8$ are as hereinafter set out; $R_6$ is lower alkylene and $R_9$ is selected from the group consisting of lower alkyl, lower alkyloxy, phenyl and

wherein $R_7$ and $R_8$ are each selected from the group consisting of hydrogen, lower alkyl, phenyl and lower alkenyl.

2. 7 - $R_2$ - 2,3-dihydro-N-methyl-2-oxo-5-($R_4$-phenyl)-1H-1,4-benzodiazepin - 1 - acetamide wherein $R_2$ and $R_4$ are selected from the group consisting of halogen, hydrogen, trifluoromethyl, nitro, lower alkyl, cyano and amino.

3. 7 - chloro - 2,3 - dihydro - N - methyl-2-oxo-5-phenyl-1H-1,4-benzodiazepin-1-acetamide.

4. 7 - chloro - 5 - (2 - fluorophenyl)-2,3-dihydro-N-methyl-2-oxo-1H-1,4-benzodiazepin-1-acetamide.

5. 2,3- - dihydro - N-methyl-2-oxo-5-phenyl-7-trifluoromethyl-1H-1,4-benzodiazepin-1-acetamide.

6. 2,3-dihydro-5-(2-fluorophenyl)-N-methyl - 7 - nitro-2-oxo-1H-1,4-benzodiazepin-1-acetamide.

7. 7 - $R_2$ - 2,3 - dihydro - 2-oxo-5-($R_4$-phenyl)-1H-1,4-benzodiazepin-1-acetamide wherein $R_2$ and $R_4$ are selected from the group consisting of halogen, hydrogen, trifluoromethyl, nitro, lower alkyl, cyano and amino.

8. 7 - chloro-2,3-dihydro-2-oxo-5-phenyl-1H-1,4-benzodiazepin-1-acetamide.

References Cited by the Examiner

UNITED STATES PATENTS 2,576,106 11/1951 Cusic.
3,121,075 2/1964 Keller et al. _____ 260—239.3

IRVING MARCUS, *Primary Examiner.*

HENRY R. JILES, *Examiner.*